United States Patent
Shang

(10) Patent No.: US 11,494,590 B2
(45) Date of Patent: Nov. 8, 2022

(54) ADAPTIVE BOOSTING MACHINE LEARNING

(71) Applicant: Nokia Technologies OY, Espoo (FI)

(72) Inventor: Chubo Shang, Tianjin (CN)

(73) Assignee: Nokia Technologies OY, Espoo (FI)

( * ) Notice: Subject to any disclaimer, the term of this patent is extended or adjusted under 35 U.S.C. 154(b) by 1044 days.

(21) Appl. No.: 16/074,820

(22) PCT Filed: Feb. 2, 2016

(86) PCT No.: PCT/CN2016/073227
§ 371 (c)(1),
(2) Date: Aug. 2, 2018

(87) PCT Pub. No.: WO2017/132846
PCT Pub. Date: Aug. 10, 2017

(65) Prior Publication Data
US 2019/0042889 A1 Feb. 7, 2019

(51) Int. Cl.
*G06K 9/62* (2022.01)
*G06N 20/20* (2019.01)
*G06N 20/00* (2019.01)

(52) U.S. Cl.
CPC ......... *G06K 9/6261* (2013.01); *G06K 9/6227* (2013.01); *G06K 9/6255* (2013.01); *G06K 9/6257* (2013.01); *G06N 20/00* (2019.01); *G06N 20/20* (2019.01)

(58) Field of Classification Search
CPC .. G06K 9/6261; G06K 9/6227; G06K 9/6255; G06K 9/6257; G06N 20/00; G06N 20/20
See application file for complete search history.

(56) References Cited

U.S. PATENT DOCUMENTS

| 8,131,011 B2 | 3/2012 | Nevatia et al. | |
| 2007/0217676 A1* | 9/2007 | Grauman | G06V 10/462 382/190 |
| 2010/0034462 A1* | 2/2010 | Nevatia | G06V 40/23 382/190 |
| 2011/0274361 A1* | 11/2011 | Bovik | G06V 20/10 382/224 |

FOREIGN PATENT DOCUMENTS

| EP | 2648159 A1 | 10/2013 |
| WO | 2010080121 A1 | 7/2010 |

OTHER PUBLICATIONS

Oct. 14, 2016, International Search Report of PCT/CN2016/073227.

(Continued)

*Primary Examiner* — Christopher M Brandt
(74) *Attorney, Agent, or Firm* — Ditthavong, Steiner & Mlotkowski

(57) ABSTRACT

An apparatus comprising memory configured to store data to be machine-recognized (710), and at least one processing core configured to run an adaptive boosting machine learning algorithm with the data, wherein a plurality of learning algorithms are applied, wherein a feature space is partitioned into bins, wherein a distortion function is applied to features of the feature space (720), and wherein a first derivative of the distortion function is not constant (730).

22 Claims, 7 Drawing Sheets

(56) References Cited

OTHER PUBLICATIONS

Office Action for related Chinese Patent Application No. 201680080767.7, dated Jun. 3, 2021, English Language Summary Included, 6 pages.
Office Action for related European Patent Application No. 16 888 671.1-1207, dated Feb. 24, 2021, 5 pages.
Office Action for European Patent Application No. 1688671.1-1207, dated Jul. 30, 2019, 7 pages.
Huang et al., "Omni-directional face detection based on real adaboost", Proc. of the 10th IEEE International Conference on Image Processing, http://media.cs.tsinghua.edu.cn/~ahz/papers/ahz-icip04.pdf, Nov. 2004, 4 pages.
Sochman et al., "Learning Fast Emulators of Binary Decision Processes", International Journal of Computer Vision 33(2), http://www.ipb.uni-bonn.de/projects/etrims/publications/Sochman-ijcv2009.pdf, Mar. 19, 2009, pp. 149-163.
Jörgensen, "AdaBoost and Histograms for Fast Face Detection", https://www.nada.kth.se/utbildning/grukth/exjobb/rapportlistor/2006/rapporter06/jorgensen_anders_06110.pdf, 2006, 48 pages.
Office Action for related Chinese Patent Application No. 201680080767.7, dated Apr. 26, 2022, with English Summary Included, 4 pages.

* cited by examiner

ADAPTIVE BOOSTING MACHINE LEARNING

FIELD

The present invention relates to machine learning algorithms of the adaptively boosted, "AdaBoost", type.

BACKGROUND

Machine learning and machine recognition finds several applications, such as, for example, automated passport control at airports, where a digital image of a person's face may be compared to biometric information, stored in a passport, characterizing the person's face.

Another example of machine recognition is in handwriting or printed document text recognition, to render contents of books searchable, for example. A yet further example is pedestrian recognition, wherein, ultimately, a self-driving car is thereby enabled to become aware a pedestrian is ahead and the car can avoid running over the pedestrian.

In addition to visual recognition, spoken language may be the subject of machine recognition. When spoken language is recognized, it may be subsequently input to a parser to provide commands to a digital personal assistant, or it may be provided to a machine translation program to thereby obtain a text in another language, corresponding in meaning to the spoken language.

Machine recognition technologies employ algorithms engineered for this purpose. For example, neural networks may be used to implement machine vision applications. A well-known machine vision algorithm is the Viola-Jones object detection framework. Machine recognition algorithms may comprise processing functions, in recognition of images such processing functions may include, for example, filtering, such as morphological filtering, thresholding, edge detection, pattern recognition and object dimension measurement.

Adaptive Boosting, or AdaBoost, is a general framework where several types of learning algorithms are used together, to improve the performance of the overall AdaBoost algorithm. Such learning algorithms, in the context of using them as sub-algorithms of AdaBoost, may be referred to as weak classifiers.

SUMMARY OF THE INVENTION

The invention is defined by the features of the independent claims. Some specific embodiments are defined in the dependent claims.

According to a first aspect of the present invention, there is provided an apparatus comprising memory configured to store data to be machine-recognized, at least one processing core configured to run an adaptive boosting machine learning algorithm with the data, wherein a plurality of learning algorithms are applied, wherein a feature space is partitioned into bins, wherein a distortion function is applied to features of the feature space, and wherein a first derivative of the distortion function is not constant.

Various embodiments of the first aspect comprise at least one feature from the following bulleted list:
  each of the learning algorithms operates on a distinct bin
  the at least one processing core is configured to partition the feature space such that at least a subset of the bins are uniformly sized
  the at least one processing core is configured to partition the feature space such that all of the bins are uniformly sized
  the at least one processing core is configured to partition the feature space such there is no overlap between any two of the bins
  the at least one processing core is configured to partition the feature space into the bins after applying the distortion function to the features
  in the adaptive boosting machine learning algorithm, each bin is treated independently
  the at least one processing core is configured to partition the feature space into 256 bins
  the at least one processing core is configured to determine, in the adaptive boosting machine learning algorithm, one of the learning algorithms as an optimal classifier in each iteration
  the at least one processing core is configured to determine, in the adaptive boosting machine learning algorithm, a final output as a weighted sum of outputs of each of the plurality of learning algorithms
  the distortion function is of the type $$f(x; x_c) = \frac{1}{1 + e^{-2(x-x_c)}}$$

the adaptive boosting machine learning algorithm comprises a training stage
  the apparatus is configured to apply the adaptive boosting machine learning algorithm to recognition of at least one of the following: spoken dialogue, human faces, pedestrians, text and documents.

According to a second aspect of the present invention, there is provided a method comprising storing data to be machine-recognized, running an adaptive boosting machine learning algorithm with the data wherein a plurality of learning algorithms are applied, wherein a feature space is partitioned into bins, wherein a distortion function is applied to features of the feature space, and wherein a first derivative of the distortion function is not constant.

Various embodiments of the first aspect comprise at least one feature from the following bulleted list:
  each of the learning algorithms operates on a distinct bin
  the feature space is partitioned such that at least a subset of the bins are uniformly sized
  the feature space is partitioned such that all of the bins are uniformly sized
  the feature space is partitioned such that there is no overlap between any two of the bins
  partitioning the feature space into the bins takes place after applying the distortion function to the features
  the adaptive boosting machine learning algorithm, each bin is treated independently
  the feature space is partitioned into 256 bins
  determining, in the adaptive boosting machine learning algorithm, one of the learning algorithms as an optimal classifier in each iteration
  determining, in the adaptive boosting machine learning algorithm, a final output as a weighted sum of outputs of each of the plurality of learning algorithms
  the distortion function is of the type $$f(x; x_c) = \frac{1}{1 + e^{-2(x-x_c)}}$$

the adaptive boosting machine learning algorithm comprises a training stage applying the adaptive boosting machine learning algorithm to recognition of at least one of the following: spoken dialogue, human faces, pedestrians, text and documents.

According to a third aspect of the present invention, there is provided An apparatus comprising means for storing data to be machine-recognized, and means for running an adaptive boosting machine learning algorithm with the data, wherein a plurality of learning algorithms are applied, wherein a feature space is partitioned into bins, wherein a distortion function is applied to features of the feature space, and wherein a first derivative of the distortion function is not constant.

According to a fourth aspect of the present invention, there is provided a non-transitory computer readable medium having stored thereon a set of computer readable instructions that, when executed by at least one processor, cause an apparatus to at least store data to be machine-recognized, and run an adaptive boosting machine learning algorithm with the data, wherein a plurality of learning algorithms are applied, wherein a feature space is partitioned into bins, wherein a distortion function is applied to features of the feature space, and wherein a first derivative of the distortion function is not constant.

According to a fifth aspect of the present invention, there is provided a computer program configured to cause a method in accordance with the second aspect to be performed.

EMBODIMENTS

In an AdaBoost algorithm, a feature space may be partitioned into uniformly sized bins or into non-uniform bins. While a uniform partitioning, into bins of the same size, is not always optimal, using a non-uniform partitioning, wherein bins are of differing sizes, involves more complex processing. A distortion function may be applied to features when using uniform partitioning, to obtain processing that is simpler than in the case of non-uniform partitioning, but with at least some benefits of non-uniform partitioning. For example, the distortion function may comprise a stretching function. In some embodiments of the invention, using the distortion function results in uniform-partitioning processing that is equivalent in results to using non-uniform partitioning. Terminologically, using the distortion function may be referred to as implicitly non-uniform partitioning.

Figure 1:
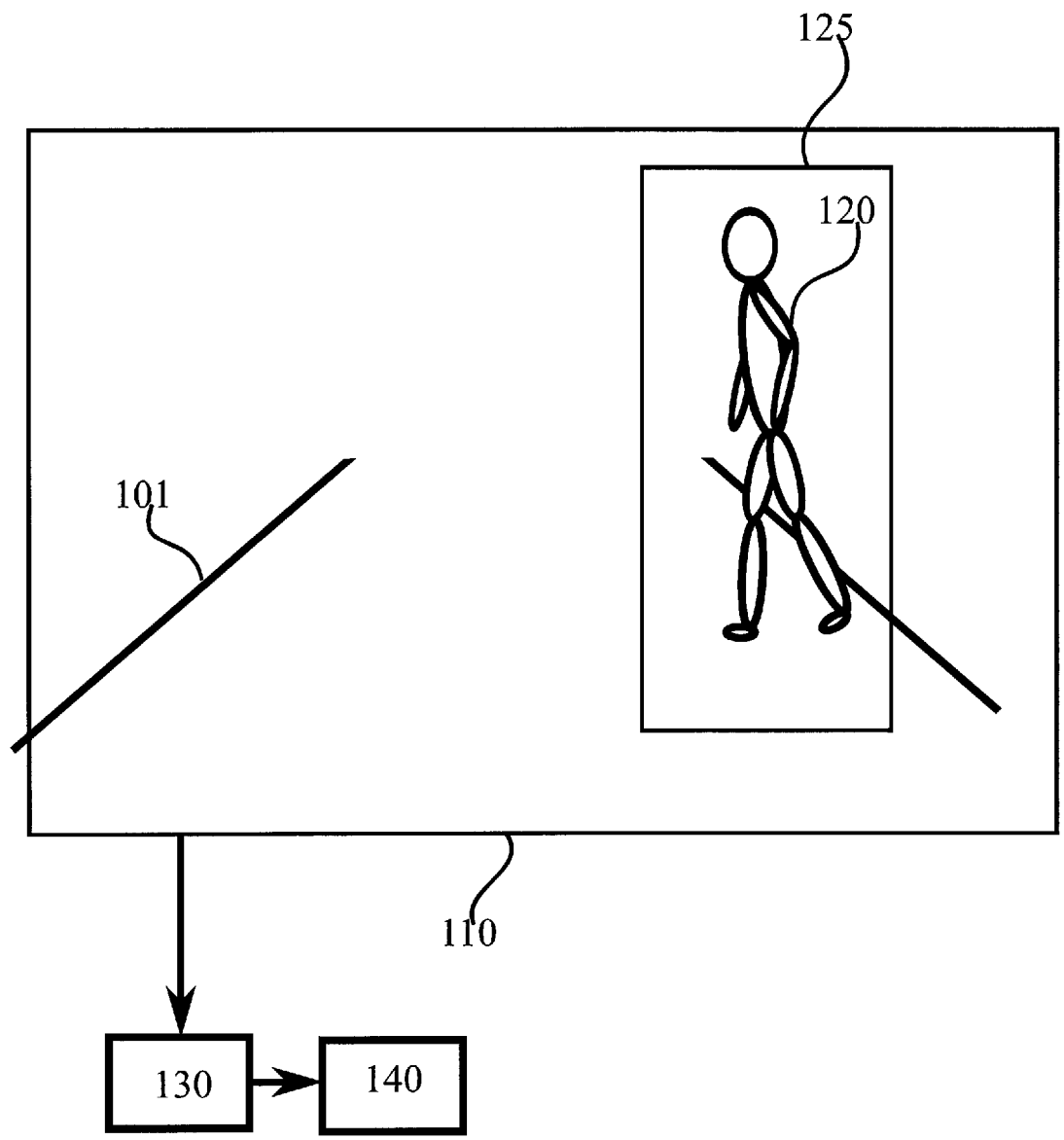
FIG. 1 illustrates an example system capable of supporting at least some embodiments of the present invention.

FIG. 1 illustrates an example system capable of supporting at least some embodiments of the present invention. FIG. 1 has a view 110 of a road 101, on which a pedestrian 120 is walking. While described herein in connection with FIG. 1 in terms of detecting pedestrians, the invention is not restricted thereto, but as the skilled person will understand, the invention is applicable also more generally to machine recognition in visual, audio or other kind of data. For example, bicyclist recognition, handwriting recognition, facial recognition, traffic sign recognition, voice recognition, language recognition, sign language recognition and/or spam email recognition may benefit from the present invention, depending on the embodiment in question.

In FIG. 1, road 101 is imaged by a camera 130. Camera 130 is configured to capture a view 110 that covers the road, at least in part. Camera 130 may be configured to pre-process image data obtained from an image capture device, such as a charge-coupled device, CCD, comprised in camera 130. Examples of pre-processing include reduction to black and white, contrast adjustment and brightness balancing to increase a dynamic range present in the captured image. In some embodiments, the image data is also scaled to a bit depth suitable for feeding into an image recognition algorithm, such as AdaBoost. Pre-processing may include selection of an area of interest, such as area 125, for example, for feeding into the image recognition algorithm. Pre-processing may be absent or limited in nature. Camera 130 may be installed, for example, in a car that is configured to drive itself. Alternatively, camera 130 may be installed in a car designed to be driven by a human driver, but to provide a warning and/or automatic braking if the car appears to be about to hit a pedestrian or animal.

An image feed from camera 130 may be provided to image recognition algorithm 140. Physically, image recognition algorithm 140 may operate in the same device as camera 130, or, alternatively, it may reside in another device. In some embodiments, image recognition algorithm 140 is arranged in a distinct computing node, which may comprise a cloud computing node, a server, or other suitable device.

Camera 130 may output an image feed, which may comprise an image frame, for example. The image frame may be digital and/or rectangular. The image frame may be provided to a filter stage, which obtains, based on the image frame, a filtered dataset that comprises features extracted from the image frame. The filter stage may comprise a plurality of filters, each designed to perform a task, such as edge detection, thresholding, feature wavelength analysis, obtaining Gaussian derivatives and/or similar tasks. The filter stage may comprise at least one neural network layer, for example. The filter layer may comprise at least one Gabor filter or Gabor wavelet filter. The features may be comprised, for example, in at least one matrix or at least one vector of numerical values, extracted by filtering from the image frame.

Where the incoming data to be recognized is not visual data, the incoming data may comprise, for example, a vector of digital samples obtained from an analogue-to-digital converter. The analogue-to-digital converter may obtain an analogue feed from a microphone, for example, and generate the samples from the analogue feed. Overall, as discussed above, data of other forms may also be the subject of machine recognition. For example, accelerometer or rotation sensor data may be used to detect whether a person is walking, running or falling.

The features may be modified by applying the distorting function, which may comprise a stretching function, to the features, before providing the distorted features to an AdaBoost algorithm that employs uniform partitioning of the feature space. The feature space may comprise the linear space of the at least one matrix of vector, in which the features are present as numerical values.

Figure 2:
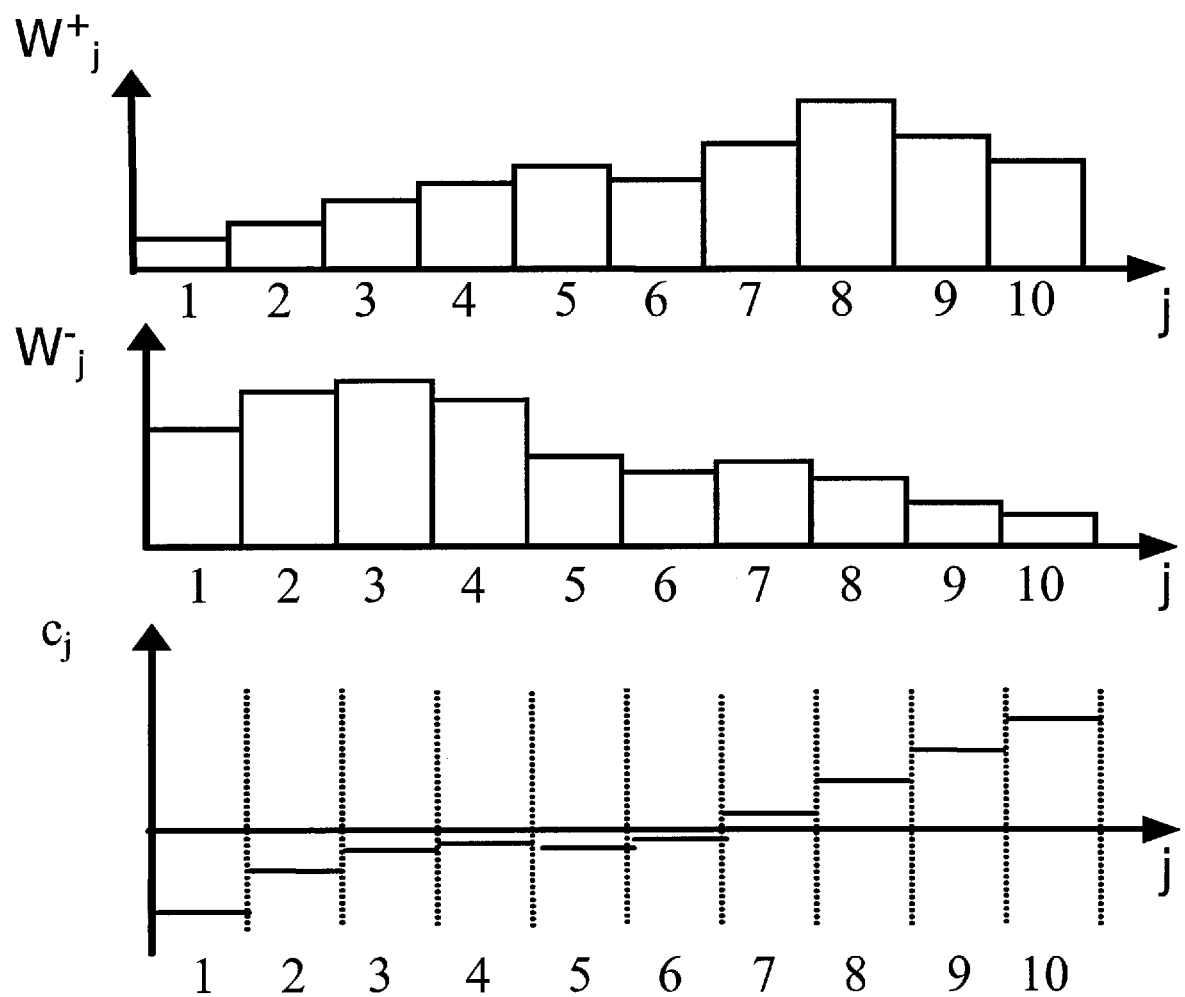
FIG. 2 illustrates classifier responses in a partitioned feature space.

FIG. 2 illustrates classifier responses in a partitioned feature space. Bins 1 to 10 are disposed on each of the three horizontal axes, with j indexing the bins and corresponding classifiers. In the uppermost part of the figure, $W^+_j$ on the vertical axis denotes a number of samples falling into bin j with a value of +1, and $W^-_j$ on the vertical axis, in the middle section of FIG. 2, denotes a number of samples falling into bin j with a value of −1. The upper and middle sections of FIG. 2 are histograms. The lower part of the figure denotes a classifier response $c_j$, wherein $c_j=\frac{1}{2}*\ln(W^+_j/W^-_j)$.

The lowest part of FIG. 2 illustrates classifier responses for classifiers, wherein for a feature domain-partitioning weak classifier, the classification of a sample is determined by which bin the sample falls into. While illustrated in the schematic figure as ten bins, in actual embodiments the number of bins may be, for example, 128, 256 or 512. Bins may be referred to as blocks. Overall each of the learning algorithms, that is classifiers, operates on a distinct bin. By operating on a distinct bin it is meant that the classification of a sample is determined by which bin the sample falls into. The classifiers may be based on different mathematical principles, or, alternatively, some or all of the classifiers may be implementations of the same underlying algorithm. The output of the learning algorithms, that is, the classifiers, is combined into a weighted sum that represents a final output of the boosted classifier.

Figure 3:
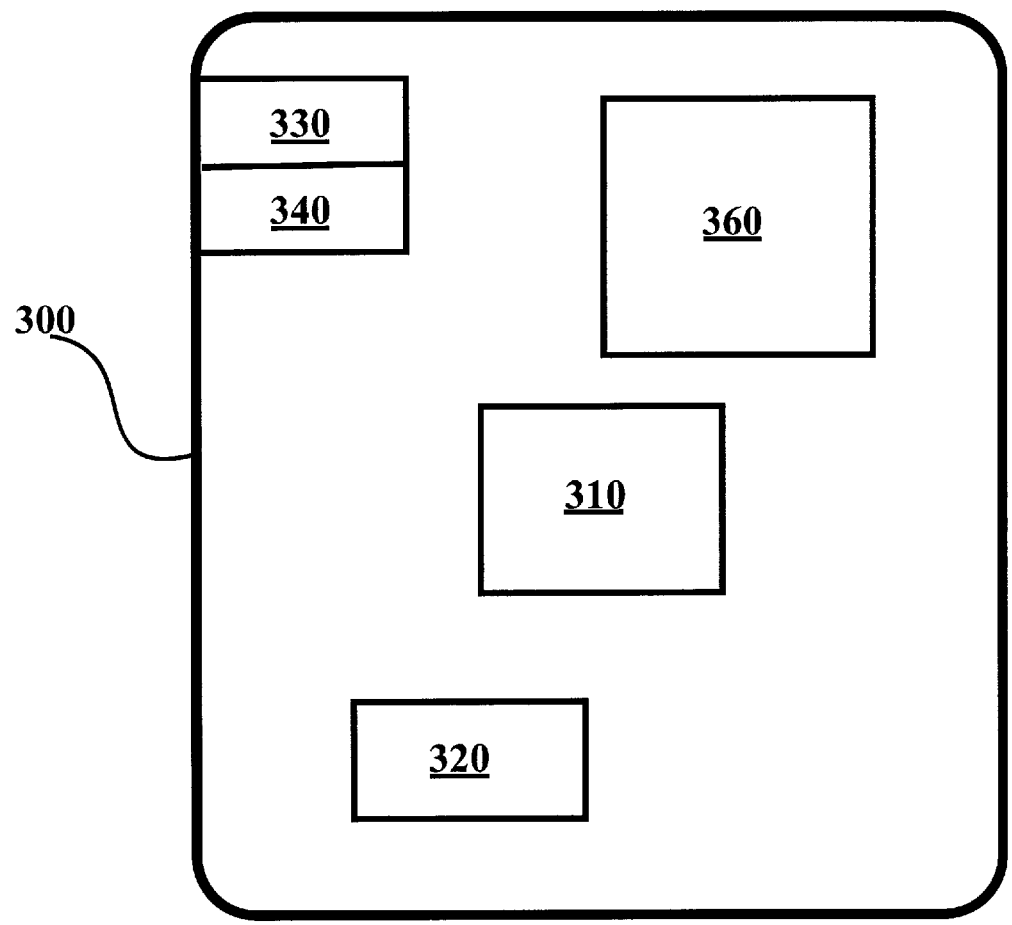
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, computing device such a server, node or cloud computing device. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Core processor, for example. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Computer instructions in memory 320 may comprise a plurality of applications or processes. For example, machine learning algorithms, such as an AdaBoost algorithm with its classifiers, may run in one application or process, a camera functionality may run in another application or process, and an output of a machine learning procedure may be provided to a further application or process, which may comprise an automobile driving process, for example, to cause a braking action to be triggered responsive to recognition of a pedestrian in a camera view.

Device 300 may comprise a transmitter 330. Device 300 may comprise a receiver 340. Transmitter 330 and receiver 340 may be configured to transmit and receive, respectively, information in accordance with at least one communication standard. Transmitter 330 may comprise more than one transmitter. Receiver 340 may comprise more than one receiver. Transmitter 330 and/or receiver 340 may be configured to operate in accordance with wireless local area network, WLAN, Ethernet, universal serial bus, USB, and/or worldwide interoperability for microwave access, WiMAX, standards, for example. Alternatively or additionally, a proprietary communication framework may be utilized.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure machine learning parameters and/or to switch device 300 on and/or off.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340, and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
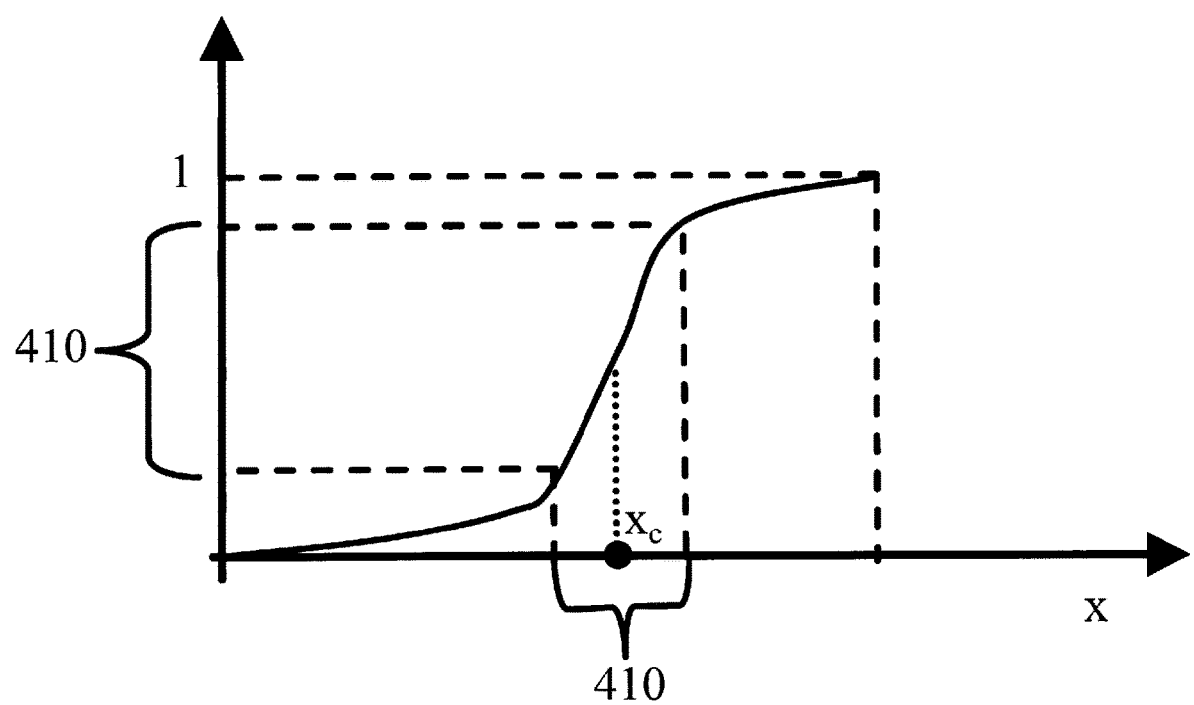
FIG. 4 illustrates an example distortion function.

FIG. 4 illustrates an example distortion function. The distortion function of FIG. 4 is of the form $$f(x; x_c) = \frac{1}{1 + e^{-2(x-x_c)}} \quad (1)$$

where $x_c$ denotes a center of a stretching effect created by this distortion function. The area of feature space being stretched is schematically denoted as 410 in the figure. In case no distortion was performed, the function would have the trivial form f(x)=x, and it would have a constant first derivative. In the instant case, features around point $x_c$ are spread out, with features outside area 410 being compressed in the remaining feature space. In general, distortion functions may be monotonically increasing, for example non-linearly increasing, meaning the first derivative is not constant. In general, distortion functions may satisfy f(0)=0 and f(1)=1, when the feature space is scaled to have dimension 1, to prevent features from being stretched outside the feature space. In general, a distortion function may act to stretch a first part of feature space and compress a second part of feature space. The second part may be disposed on both sides of the first part.

The weighted training error $Z_t$ is defined as that in classical AdaBoost with domain-partitioning weak classifiers, reference is made to R. E. Schapire and Y. Singer: "Improved boosting algorithms using confidence-rated predictions", Machine Learning, 37(3): 297-336, 1999. Let $S=[(x_1,y_1), \ldots, (x_m,y_m)]$ be a sequence of training samples where each instance $x_i$ belongs to a feature space or instance space $\chi$ and each label $y_t$ belongs to a binary label space $y=\{+1,-1\}$. Generally speaking, AdaBoost is an iteration process where an optimal weak classifier $h_1(x)$ is computed in each iteration t. The final output is the strong classifier $$H(x) = \text{sign}\left(\sum_{t=1}^{T} \alpha_t h_t(x)\right)$$

which combines the weak classifiers with optimal weights $\alpha_i$. The goal of each iteration is to compute a weak classifier $h_t(x): \chi \to \mathbb{R}$ given a sequence of training samples S along with a distribution D over $\{1, \ldots, m\}$, that is, over the indices of S. The weak classifier can be obtained by minimizing the weighted training error $z_t$. Reference is here made to R. E. Schapire and Y. Singer: "Improved boosting algorithms using confidence-rated predictions", Machine Learning, 37(3): 297-336, 1999):

$$Z_t = \sum_{i=1}^{m} D_t(i) \exp(-\alpha_t y_i h_t(x_i)) \quad (2)$$

By folding $\alpha_t$ into $h_t$, $Z_t$ and H can be expressed as $$Z_t = \sum_{i=1}^{m} D_t(i) \exp(-y_i h_t(x_i)) \quad (3)$$

and $$H(x) = \text{sign}\left(\sum_{t=1}^{T} h_t(x)\right), \quad (4)$$

respectively. For the sake of notation simplicity, in what follows we omit the subscript t of $h_t$, $D_t$, and $\alpha_t$.

The minimization of $Z_t$ can be accomplished by domain partitioning, see e.g. R. E. Schapire and Y. Singer: "Improved boosting algorithms using confidence-rated predictions", Machine Learning, 37(3): 297-336, 1999. Specifically, each weak classifier may be associated with a partition of $\chi$ into disjoint blocks $X_1, \ldots, X_N$ and for which $h(x)=h(x')$ holds for all x, $x' \in X_j$. The response of h(x) depends only on which block $X_j$ a given sample x falls into. To be more specific, h(x) equals to a function of the ratio of the weighted fraction $W_+^j$ of samples falling into block j with label +1 and the weighted fraction $W_-^j$ of samples falling into block j with label −1. $W_+^j$ and $W_-^j$ are defined respectively as $$W_+^j = \sum_{i=1}^{m} D(i) [\![ x_i \in X_j \wedge y_i = 1 ]\!] \quad (5)$$

and $$W_-^j = \sum_{i=1}^{m} D(i) [\![ x_i \in X_j \wedge y_i = -1 ]\!] \quad (6)$$

With and $W_+^j$ and $W_-^j$ letting $c_j = h(x)$ for $x \in X_1$, $Z_1$ can be calculated as:

$$\begin{aligned} Z_t &= \sum_{i=1}^{m} D_t(i) \exp(-y_i h_t(x_i)) \\ &= \sum_j \sum_{i: x_i \in X_j} D_t(i) \exp(-y_i c_j) \\ &= \sum_j \left( \sum_{i: x_i \in X_j \wedge y_i = 1} D_t(i) e^{-c_j} + \sum_{i: x_i \in X_j \wedge y_i = -1} D_t(i) e^{c_j} \right) \\ &= \sum_j (W_+^j e^{-c_j} + W_-^j e^{c_j}). \end{aligned} \quad (7)$$

Computing the derivative of $Z_t$ with regard to $x_j$ and letting it to be zero yields the optimal solution:

$$c_j = \frac{1}{2} \ln\left(\frac{W_+^j}{W_-^j}\right) \quad (8)$$

Substituting (8) into (7) yields $$Z_t = 2 \sum_j \sqrt{W_+^j W_-^j} \quad (9)$$

Figure 5:
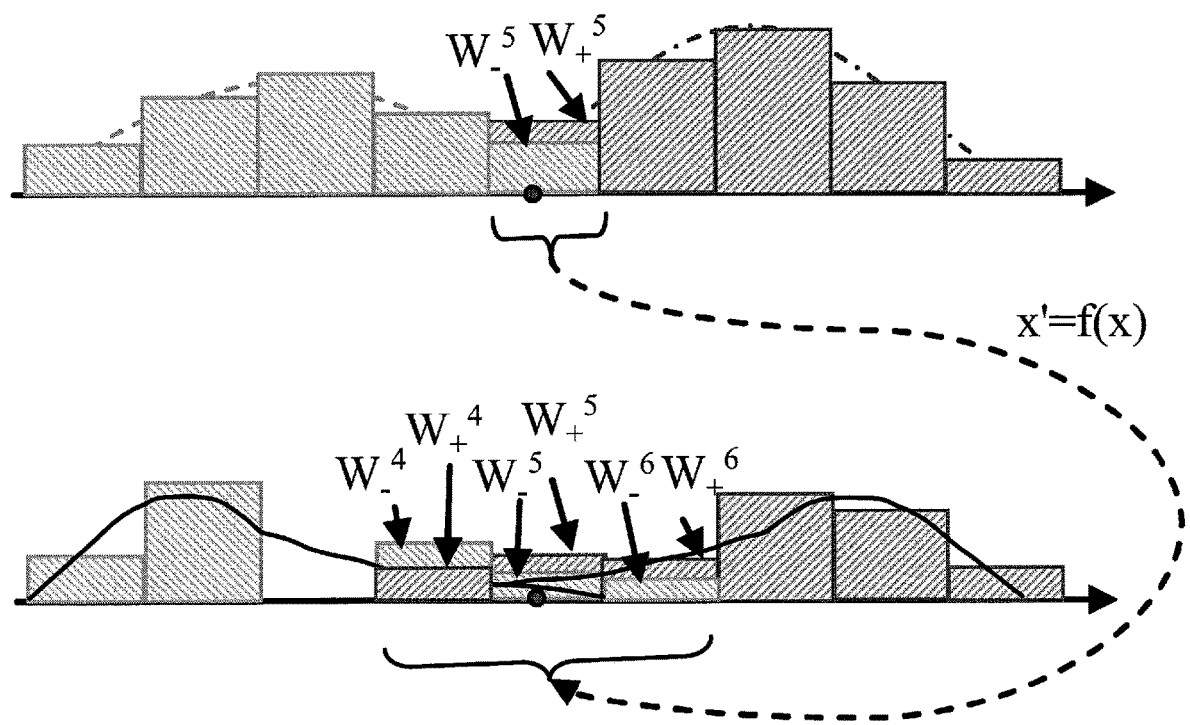
FIG. 5 illustrates distortion of feature space using a distortion function.

The usefulness of the function is graphically supported by FIG. 5. In FIG. 5, the dotted curves are continuous versions of $W_+^j$ and $W_-^j$ respectively. The sampler number in block j for calculating $W_+^j$ and $W_-^j$ is finite whereas it is infinite for calculating in the dotted curves In the upper section of FIG. 5, the dotted curves intersect at block #5. So it holds that $W_-^j>0$ for $j=1, \ldots, 5$, $W_-^j=0$ for $j=6, \ldots, 9$, and $W_+^j=0$ for $j=1, \ldots, 4$, $W_+^j>0$ for $j=5, \ldots, 9$. Consequently, the training error $Z_t$ (see equation 9) is:

$$Z_t = 2\sum_{j=1}^{9}\sqrt{W_+^j W_-^j} = 2\sqrt{W_+^5 W_-^5} \qquad (10)$$

Now employ $f(x; x_c)$ to stretch the features with the center $x_c$ inside block #5. Because $f(x-x_c)$ has large slope nearby $x_c$, block #5 in FIG. 5 is spread as blocks #4, #5, and #6. Correspondingly, e in the upper part of FIG. 5 becomes $W_+^4$, $W_+^5$, and $W_+^6$ in the lower part of FIG. 5. Denote e in FIG. 2(a) by a. Denote $W_+^4$, $W_+^5$, and $W_+^6$ in the lower part of FIGURE by $a_1$, $a_2$, and $a_3$, respectively. Then we have:

$$a = a_1 + a_2 + a_3 \qquad (11)$$

Meanwhile, $W_-^5$ in the upper part of FIG. 5 becomes $W_-^4$, $W_-^5$, and $W_-^5$ in the lower part of FIG. 5. Denote $W_-^5$ in the upper part of FIG. 5 by b. Denote $W_-^4$, $W_-^5$, and $W_-^6$ in the lower part of FIG. 5 by $b_1$, $b_2$, and $b_3$, respectively. Then we have:

$$b = b_1 + b_2 + b_3 \qquad (12)$$

The training error $Z_t$, that is, equation 9, corresponding to the upper part of FIG. 5 can be re-written as:

$$Z_t = 2\sum_{j=1}^{9}\sqrt{W_+^j W_-^j} = 2\sqrt{W_+^5 W_-^5} = 2\sqrt{ab} \qquad (13)$$

The training error $Z'_t$ corresponding to the lower part of FIG. 5 can be expressed as:

$$Z'_t = 2\sum_{j=1}^{9}\sqrt{W_+^j W_-^j} = 2\sum_{j=4}^{6}\sqrt{W_+^j W_-^j} = 2\sum_{i=1}^{3}\sqrt{a_i b_i} \qquad (14)$$

It can be proved (see the proof of Theorem 1) that:

$$Z'_t < Z_t \qquad (15)$$

Inequality 15 tells that applying the stretching function $f(x; x_c)$ reduces the training error. More generally, we have the following theorem.

Theorem 1. Consider a block j where the weighted fractions $a \triangleq W_+^j 0$ and $b \triangleq W_-^j > 0$, respectively. The training error $Z_t$ corresponding to the block j is $Z_t = 2\sqrt{ab}$. Let is a point inside the block j. With a monotonically increasing function $f(x-x_c)$, $a \triangleq W_+^j$ of the block j is stretched to n blocks whose weighted fractions are $a_1, \ldots, a_n$ (here $a_i \triangleq W_+^i$). Similarly, $b \triangleq W_-^j$ of the same block j is stretched to n blocks whose weighted fractions are $b_1, \ldots, b_n$ (here $b_i \triangleq W_-^j$). The training error $Z'_t$ corresponding to the stretched histogram is $$Z'_t = 2\sum_{i=1}^{n}\sqrt{a_i b_i}.$$

Then it holds that $$Z'_t = 2\sum_{i=1}^{n}\sqrt{a_i b_i} \leq 2\sqrt{ab} = Z_t \qquad (16)$$

Proof.
A fact is that $$a = \sum_{i=1}^{n} a_i \qquad (17)$$

and $$b = \sum_{i=1}^{n} b_i \qquad (18)$$

Therefore, it is equivalent to prove $$\sqrt{\sum_{i=1}^{n} a_i \sum_{i=1}^{n} b_i} \geq \sum_{i=1}^{n}\sqrt{a_i b_i} \qquad (19)$$

or $$\sum_{i=1}^{n} a_i \sum_{i=1}^{n} b_i \geq \left(\sum_{i=1}^{n}\sqrt{a_i}\sqrt{b_i}\right)^2 \qquad (20)$$

Here, inequality 20 is the known Cauchy-Buniakowsky-Schwarz inequality.

FIG. 5 illustrates distortion of feature space using a distortion function, as already briefly discussed above. In the top part of FIG. 5 are illustrated feature space bins before distortion with the distortion function x'=f(x). Histogram $W_-^5$ is expanded, by stretching with f(x), to $W_-^4$, $W_-^5$ and $W_-^6$ in the lower part of the figure. Histogram $W_+^5$ is expanded, by stretching with f(x), to $W_+^4$, $W_+^5$ and $W_+^6$. FIG. 5, like FIG. 2, is schematic as histograms in actual embodiments of the invention are foreseen to be more complex in shape.

In the following, an algorithm will be described, wherein a training stage is described first, to be followed by a testing stage.

The stretching function $f$ has a parameter $x_c$ which determines which portion is to be spread and which portion is to be narrowed, or compressed. Let $x_o$ be the center of the block j where the difference between $W_+^j$ and $W_-^j$ is the least, $j=1, \ldots, N$. FIG. 2 tells that it is reasonable to let $x_c \leftarrow x_o$. One can also search in a region neighboring to $x_o$ and output $x_c$ as the one with the smallest training error $Z_t$. It is noted that it is possible that stretching a kind of features does not improve the classification performance when the histograms are complex or the optimal $x_c$ is not found. Therefore, in some embodiments of our algorithm, stretching is not applied if it does not result in lower training error. The algorithm is summarized in the following algorithm:

1: Input: $(x_1, y_1), \ldots, (x_m, y_m)$; $x_i \in \chi$, $y_i \in \{+1, -1\}$.

2: Initialization: $D_1(i) = 1/m$

3: Iterate t=1, . . . , T
4: Before Stretching
   Uniformly partition the feature domain into N blocks: $\chi_1, \ldots, \chi_N$
5: Compute $$W_+^j = \sum_{i=1}^m D(i)[\![x_i \in X_j \wedge y_i = 1]\!]$$

and $$W_-^j = \sum_{i=1}^m D(i)[\![x_i \in X_j \wedge y_i = -1]\!]$$

for each block j
6: Compute the response $c_j$ of the weak classifier $h_t$ at block j:

$$c_j = \frac{1}{2}\ln\left(\frac{W_+^j}{W_-^j}\right)$$

7: Calculate weighed training error $$Z_t = \sum_{j=1}^N \left(W_+^j e^{-c_j} + W_-^j e^{c_j}\right)$$

8: Find the point $x_c$ so that the block containing it holds $W_+^j = W_-^j$.
9: Stretching
10: Stretch the features by the function $f(x-x_c)$
11: Uniformly partition the stretched feature domain into N blocks: $\chi_1, \ldots, \chi_N$
12: Compute $$W_+^j = \sum_{i=1}^m D(i)[\![x_i \in X_j \wedge y_i = 1]\!]$$

and $$W_-^j = \sum_{i=1}^m D(i)[\![x_i \in X_j \wedge y_i = -1]\!]$$

for each block j
13: Compute the response $c'_j$ of the weak classifier $h_t$ at block j:

$$c'_j = \frac{1}{2}\ln\left(\frac{W_+^j}{W_-^j}\right)$$

14: Calculate weighed training error $$Z'_t = \sum_{j=1}^N \left(W_+^j e^{-c'_j} + W_-^j e^{c'_j}\right)$$

15: If $Z'_t \leq Z_t$, then $Z \leftarrow Z'_t$ and take $c'_j$ as the response of the weak classifier $h_t$ at block j . . .
16: If $Z'_t > Z_t$, then $Z \leftarrow Z_t$ and take $c_j$ as the response of the weak classifier $h_t$ at block j.
17: Update $D_{t+1}(i) = D_t(i)\exp(-y_i h_t(x_i))/Z$
18: Output the strong classifier $$H(x) = \text{sign}\left(\sum_{t=1}^T h_t(x)\right)$$

Testing Stage:

It is noted that in the training stage the features may be stretched by $f$ and then, subsequently, the weighted fractions $W_+^j$ and $W_-^j$ may be computed, respectively. Suppose that $x_?$ is a sample to be classified in the testing stage. One strategy is to map $x_?$ by $f$ (the result is denoted by $x'_?$ with $x'_? = f(x_?; x_c)$, determine which block $x'_?$ belongs to and then calculate the classifier response k according to $W_+^{i'}$ and $W_-^{i'}$ where $i' = \lceil x'_? / \Delta d_{large} \rceil$ indexes the block $x'_?$ belongs to. $\Delta d_{large}$ stands for the block width, or step, in the mapped domain and $\lceil x \rceil$ stands for round up function, for example round toward infinity. Suppose that the features are in the range [0,1] and the number of blocks is N (a typical value is N=256), then $\Delta d_{large} = 1/N$.

Overall, due to the stretching function, the proposed implicitly non-uniform domain partitioning method has less weighted training error and testing error than the classical domain-partitioning method.

The INRIA pedestrian dataset is used for showing weighted training error. One can see from that the weighted training error of the proposed method is steadily lower than that of the DP-AdaBoost. Therefore, it is concluded that the stretching function plays a positive role on decreasing the weighted training error. The difference is illustrated in FIG. 6, wherein the dashed curve corresponds to classical domain partitioning AdaBoost, and the dashed curve corresponds to the proposed implicitly non-uniform domain partitioning, INDP-AdaBoost.

Figure 6:
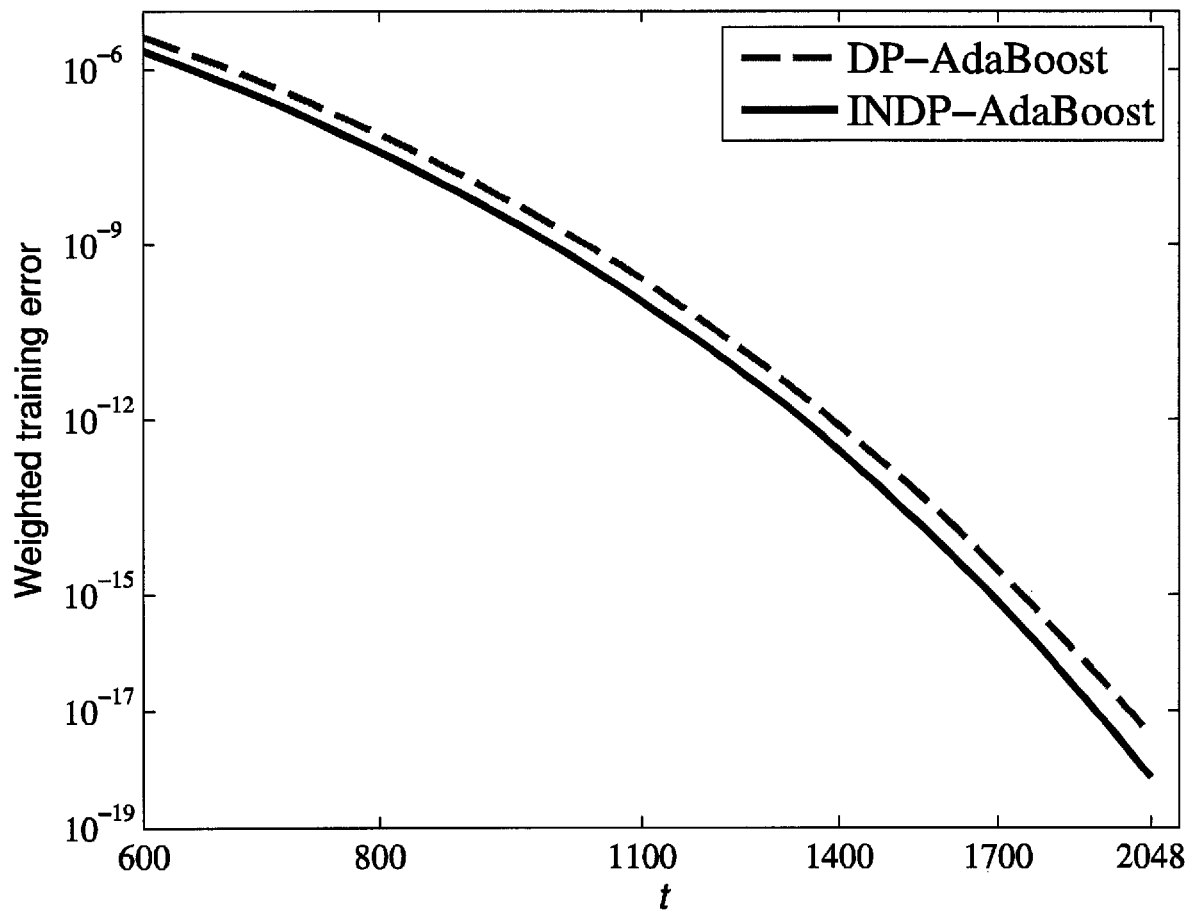
FIG. 6 illustrates a difference between a conventional AdaBoost method and an implicitly non-uniformly partitioned AdaBoost method.

In FIG. 6, The Caltech pedestrian dataset is used for comparing the testing error. FIG. 6 compares the ROC curves of the proposed INDP-AdaBoost with those of DP-AdaBoost when ACF features are adopted. For ACF features, see P. Dollar, R. Appel, S. Belongie, and P. Perona: "Fastest feature pyramids for object detection", PAMI, 36(8):1532-1545, 2014. It can be seen that INDP-AdaBoost outperforms DP-AdaBoost at all the operating points. Specifically, the log-average miss rates of the INDP-AdaBoost and DP-AdaBoost are 41.97% and 44.51%, respectively. The proposed method outperforms the traditional method by 2.54 percent.

Figure 7:
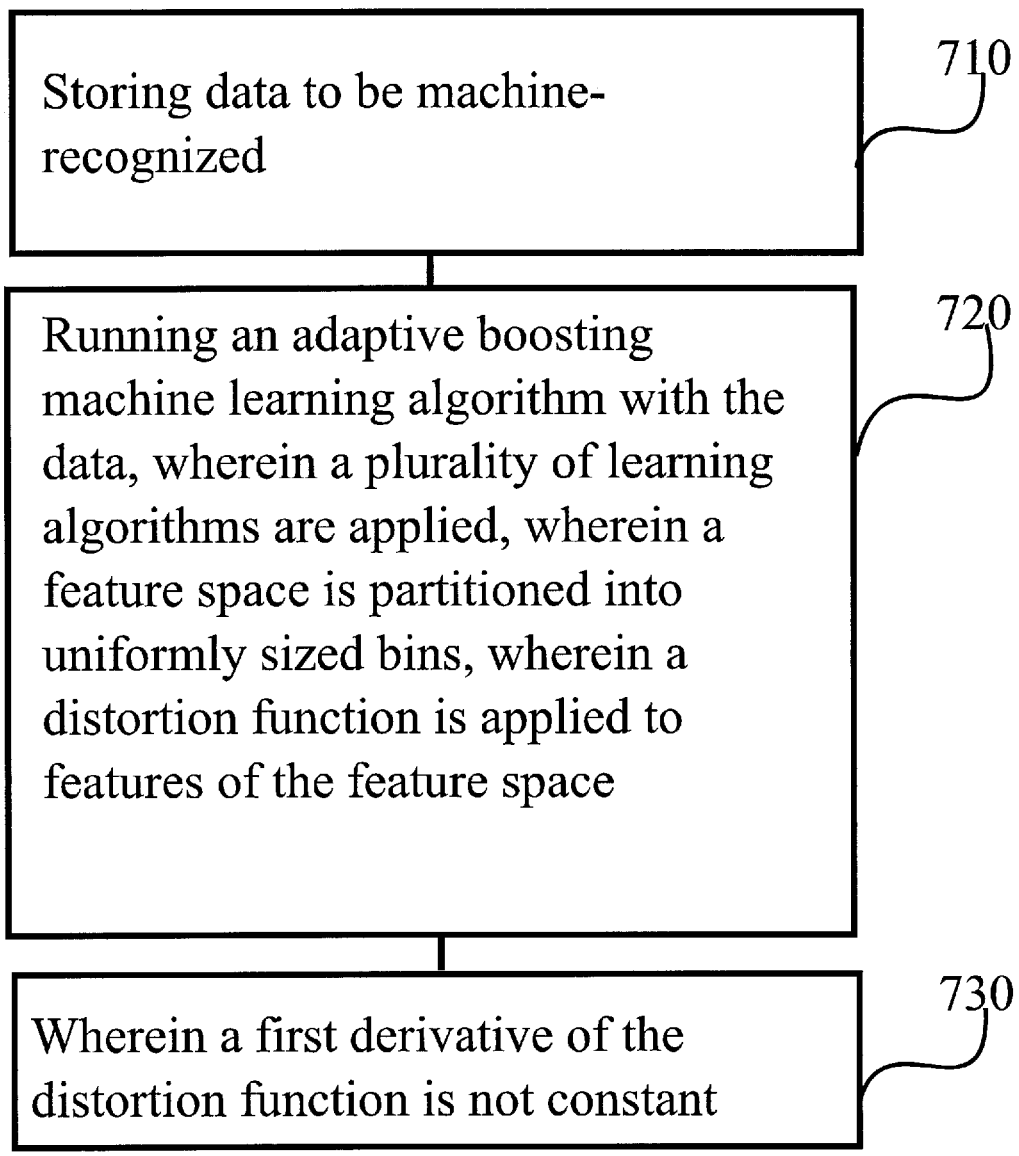
FIG. 7 is a flow graph of a method in accordance with at least some embodiments of the present invention.

FIG. 7 is a flow graph of a method in accordance with at least some embodiments of the present invention. The phases of the illustrated method may be performed in a device arranged to perform the AdaBoost algorithm, for example, by a control device of such a device.

Phase 710 comprises storing data to be machine-recognized. Phase 720 comprises running an adaptive boosting machine learning algorithm with the data, wherein a plurality of learning algorithms are applied, wherein a feature space is partitioned into bins, wherein a distortion function is applied to features of the feature space. Finally, phase 730 comprises wherein a first derivative of the distortion function is not constant.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optimizing machine recognition, to, for example, reduce traffic accidents in self-driving vehicles.

REFERENCE SIGNS LIST

| | |
|---|---|
| 110 | View |
| 101 | Road |
| 125 | Area of interest |
| 120 | Pedestrian |
| 130 | Camera |
| 140 | Image recognition algorithm |
| 300-360 | Structure of device of FIG. 3 |
| 410 | The area of feature space being stretched |
| 710-730 | Phases of the method of FIG. 7 |

CITATION LIST

[1] R. Abiantun and M. Savvides. Dynamic three-bin real AdaBoost using biased classifiers: an application in face detection. In *Proc. IEEE Intl' Conf. Biometrics: Theory, Applications, and Systems,* 2009.
[2] Z. Fu, D. Zhang, X. Zhao, and X. Li. Adaboost algorithm with floating threshold. In *ACAI,* 2012.
[3] R. E. Schapire and Y. Singer. Improved boosting algorithms using confidence-rated predictions. *Machine Learning,* 37(3): 297-336, 1999.
[4] Wen J and Xiong Y. Smoothing LUT classifiers for robust face detection. In *ICIST,* 2013.
[5] Y. Hanai and T. Kuroda. Face detection through compact classifier using adaptive Look-Up-Table. In *ICIP,* 2009.
[6] C. Huang, H. Ai, T. Yamashita, S. Lao, and M. Kawade. Incremental learning of boosted face detector. In *ICCV,* 2007.
[7] P. Sharma, C. Huang, and R. Nevatia. Unsupervised incremental learning for improved object detection in a video. In *CVPR,* 2012.
[8] Z. Li and Y Zhao. Pedestrian detection in single frame by edgelet-LBP part detectors. In *AVSS,* 2013.

What I claim is:

1. An apparatus comprising:
   memory configured to store data to be machine-recognized;
   at least one processing core configured to run an adaptive boosting machine learning algorithm with the data, wherein a plurality of learning algorithms are applied, wherein a feature space is partitioned into bins, wherein a distortion function is applied to features of the feature space, and
   wherein a first derivative of the distortion function is not constant.

2. The apparatus according to claim 1, wherein each of the learning algorithms operates on a distinct bin.

3. The apparatus according to claim 1, wherein the at least one processing core is configured to partition the feature space such that at least a subset of the bins are uniformly sized.

4. The apparatus according to claim 1, wherein the at least one processing core is configured to partition the feature space such that all of the bins are uniformly sized.

5. The apparatus according to claim 1, wherein the at least one processing core is configured to partition the feature space such that there is no overlap between any two of the bins.

6. The apparatus according to claim 1, wherein the at least one processing core is configured to partition the feature space into the bins after applying the distortion function to the features.

7. The apparatus according to claim 1, wherein in the adaptive boosting machine learning algorithm, each bin is treated independently.

8. The apparatus according to claim 1, wherein the at least one processing core is configured to partition the feature space into 256 bins.

9. The apparatus according to claim 1, wherein the at least one processing core is configured to determine, in the adaptive boosting machine learning algorithm, one of the learning algorithms as an optimal classifier in each iteration.

10. The apparatus according to laim 1 wherein the at least one processing core is configured to determine, in the adaptive boosting machine learning algorithm, a final output as a weighted sum of outputs of each of the plurality of learning algorithms.

11. The apparatus according to claim 1, wherein the apparatus is a smartphone or automobile; wherein the data is image data; and wherein the final output of the stored data that is machine-recognized is at least one of the following: a human face, a pedestrian, a bicyclist recognition, a handwriting recognition, a traffic sign recognition, a sign language recognition, a text, or a document.

12. The apparatus according to claim 1, wherein the apparatus is a smartphone; wherein the stored data is acceleration sensor data; and wherein a final output of the stored data that is machine-recognized is at least one of the following: a person is walking, the person is running, or the person is falling.

13. A method comprising:
storing data to be machine-recognized;
running an adaptive boosting machine learning algorithm with the data, wherein a plurality of learning algorithms are applied, wherein a feature space is partitioned into bins, wherein a distortion function is applied to features of the feature space, and
wherein a first derivative of the distortion function is not constant.

14. The method according to claim 13, wherein each of the learning algorithms operates on a distinct bin.

15. The method according to claim 13, wherein the feature space is partitioned such that at least a subset of the bins are uniformly sized.

16. The method according to claim 13, wherein the feature space is partitioned such that all of the bins are uniformly sized.

17. The method according to claim 13, wherein the feature space is partitioned such that there is no overlap between any two of the bins.

18. The method according to claim 13, wherein partitioning the feature space into the bins takes place after applying the distortion function to the features.

19. The method according to claim 13, wherein in the adaptive boosting machine learning algorithm, each bin is treated independently.

20. The method according to claim 13, wherein the feature space is partitioned into 256 bins.

21. The method according to claim 13, further comprising determining, in the adaptive boosting machine learning algorithm, one of the learning algorithms as an optimal classifier in each iteration.

22. A non-transitory computer readable medium having stored thereon a set of computer readable instructions that, when executed by at least one processor, cause an apparatus to at least:
store data to be machine-recognized, and
run an adaptive boosting machine learning algorithm with the data, wherein a plurality of learning algorithms are applied, wherein a feature space is partitioned into bins, wherein a distortion function is applied to features of the feature space, and wherein a first derivative of the distortion function is not constant.

\* \* \* \* \*